Figure 1:
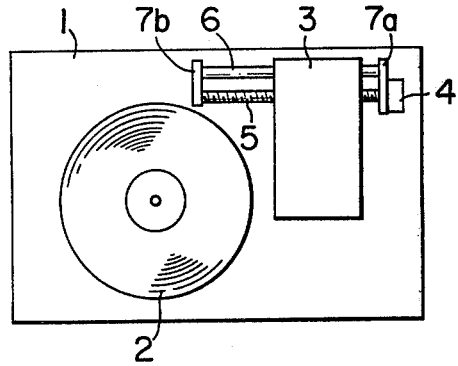

United States Patent [19]
Nanbu et al.

[11] 4,166,623
[45] Sep. 4, 1979

[54] PICKUP NEEDLE CLEANING DEVICE FOR RECORD DISC PLAYBACK APPARATUS

[75] Inventors: Kenji Nanbu, Moriguchi; Akio Kuki, Katano, both of Japan

[73] Assignee: Matsushita Electric Industries Co., Ltd., Osaka, Japan

[21] Appl. No.: 870,209

[22] Filed: Jan. 17, 1978

[51] Int. Cl.² ............................................. G11B 3/58
[52] U.S. Cl. ................................. 274/1 R; 274/47
[58] Field of Search ............................. 274/47, 1 R

[56] References Cited

U.S. PATENT DOCUMENTS

| | | | |
|---|---|---|---|
| 2,955,825 | 10/1960 | Staar | 274/47 X |
| 3,162,445 | 12/1964 | Henry | 274/47 |
| 3,266,807 | 8/1966 | Van Antwerp | 274/47 X |
| 3,405,946 | 10/1968 | Bodoh et al. | 274/47 |
| 3,881,734 | 5/1975 | Leedom | 274/47 X |

*Primary Examiner*—Charles E. Phillips
*Attorney, Agent, or Firm*—Stevens, Davis, Miller & Mosher

[57] ABSTRACT

Disclosed is a pickup needle cleaning device adapted to be incorporated in a record disk playback system having a carriage adapted to move above and across the surface of a record disk and mounting a pickup needle for optional engagement with the record disk. The cleaning device includes cleaning members carried by the carriage and adapted to move relatively to the pickup needle while keeping in contact therewith. The cleaning member is put into operation upon the upward or downward movement of the pickup needle.

8 Claims, 16 Drawing Figures

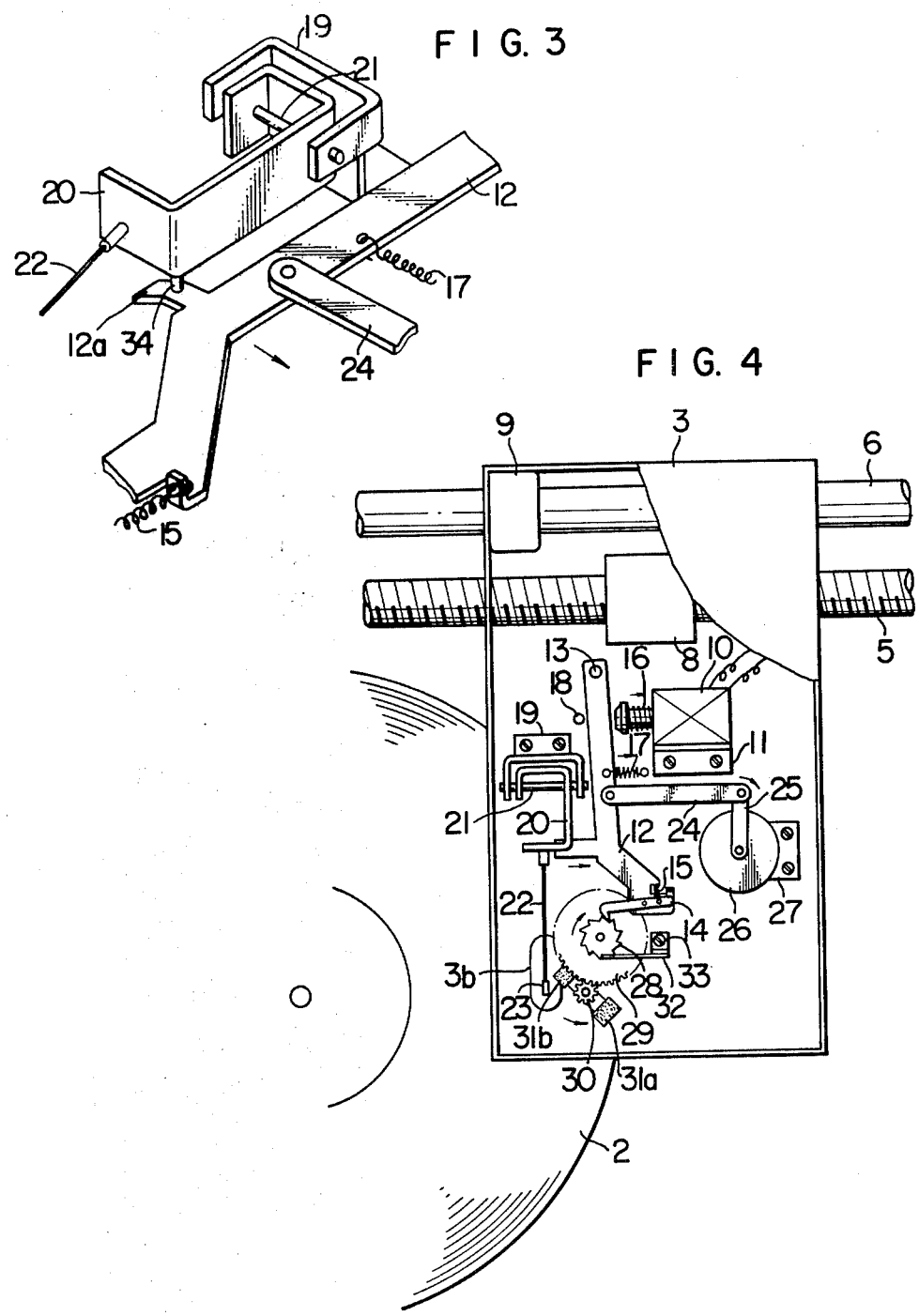

F I G. 11
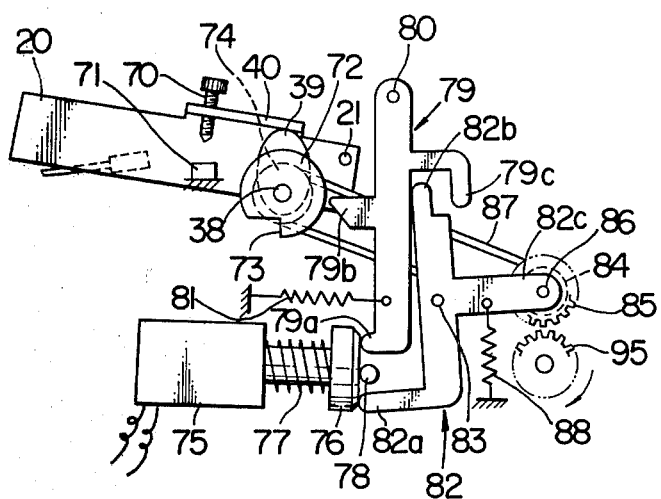
F I G. 12
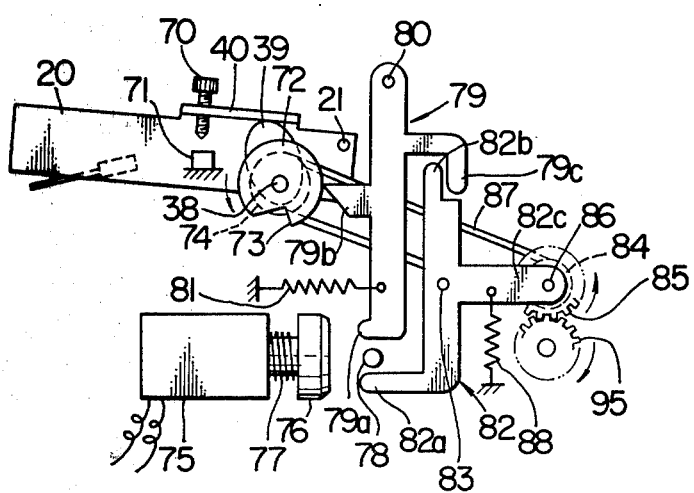

PICKUP NEEDLE CLEANING DEVICE FOR RECORD DISC PLAYBACK APPARATUS

The present invention relates to a reproducing apparatus adapted for reproducing signals by scanning the surface of a disk-shaped recording medium by means of a scanning body and, more particularly, to such a device incorporated in the reproducing apparatus adapted for automatically cleaning the scanning body at the time of starting of the reproduction or at optional times.

The cleaning device in accordance with the invention can most effectively be applied to video disk players in which video signals are recorded at an extremely high density.

A disk-shaped recording medium for video record players generally carries an extremely fine recording groove, the pitch and the depth of which are as small as less than 5 $\mu$m and less than 1 $\mu$m, respectively. While, the disk-shaped recording medium is rotated, during the reproduction, at a high speed in the order of 450 to 1800 r.p.m.

For these reasons, dust or foreign objects attaching to the pickup means, especially to the pickup needle for contacting the groove of the disk largely deteriorate the groove-following characteristic of the pickup means, as well as the SN ratio of the reproduced image. Also, the life of the pickup needle, as well as that of the disk, is inconveniently shortened.

It is therefore an object of the invention to provide a cleaning device adapted to be actuated in association with the operation of a mechanism for raising and lowering the pickup means, so as to ensure that the pickup needle is put into engagement with the groove of the disk only after it is cleaned, thereby to eliminate above stated problems in the prior art.

Figure 2:
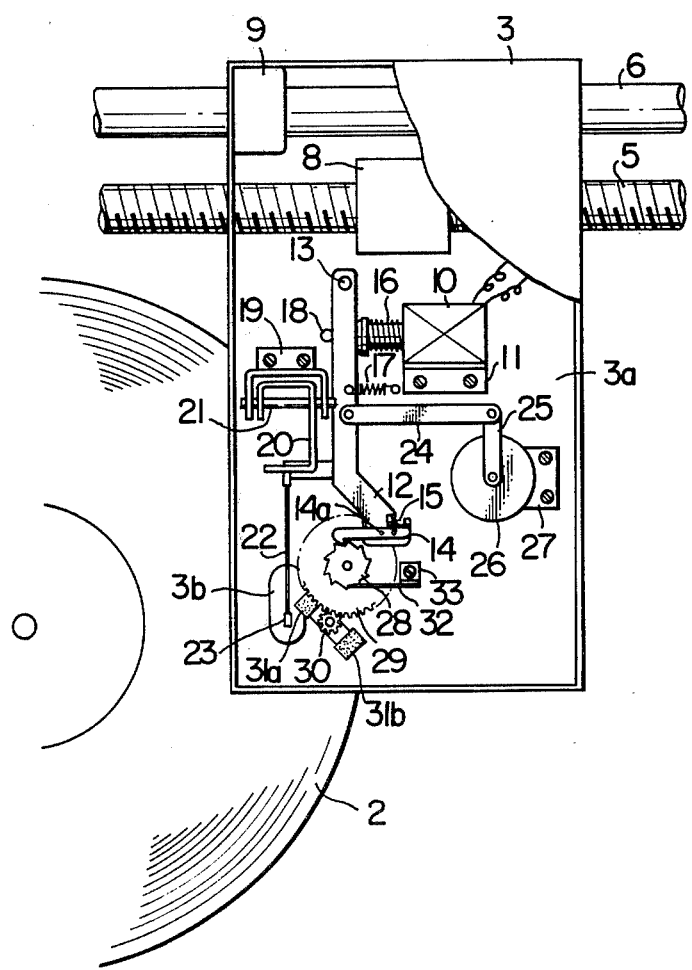
Figure 5:
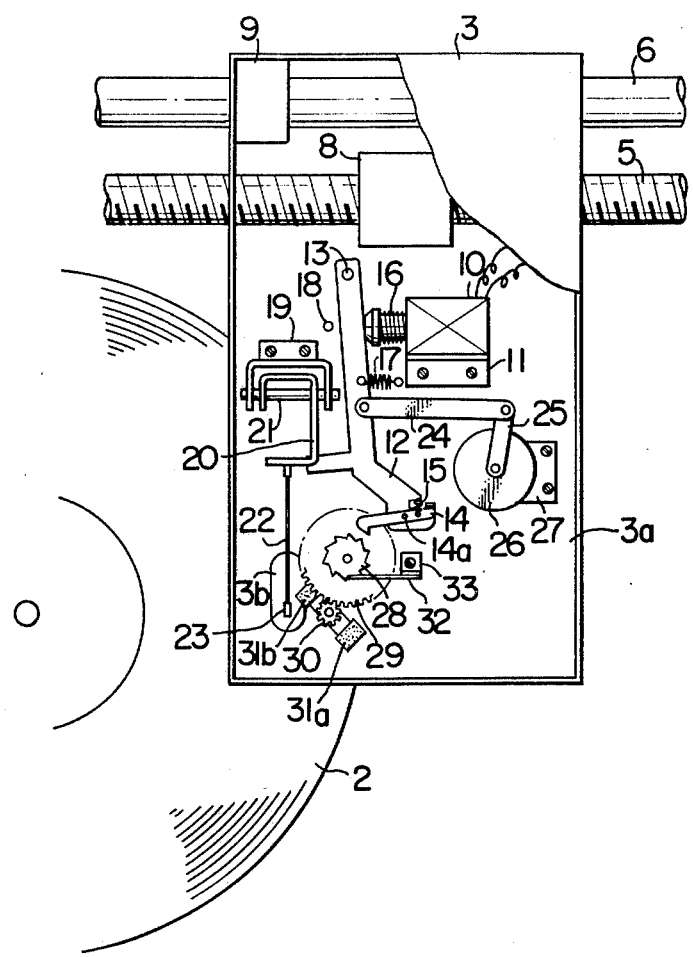
Figure 6A:
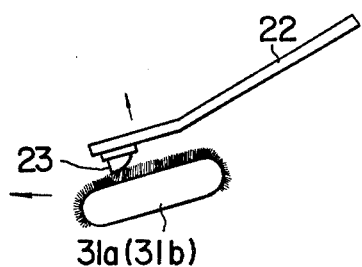
Figure 6B:
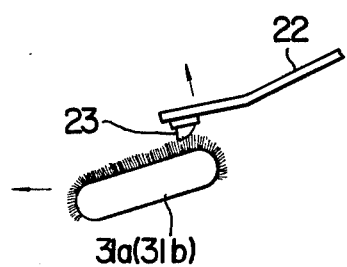
Figure 7A:
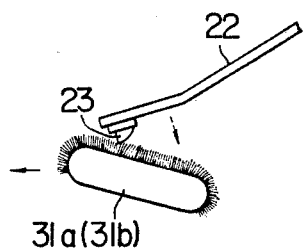
Figure 7B:
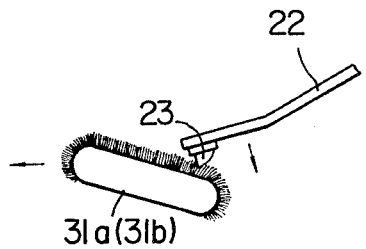
Figure 8:
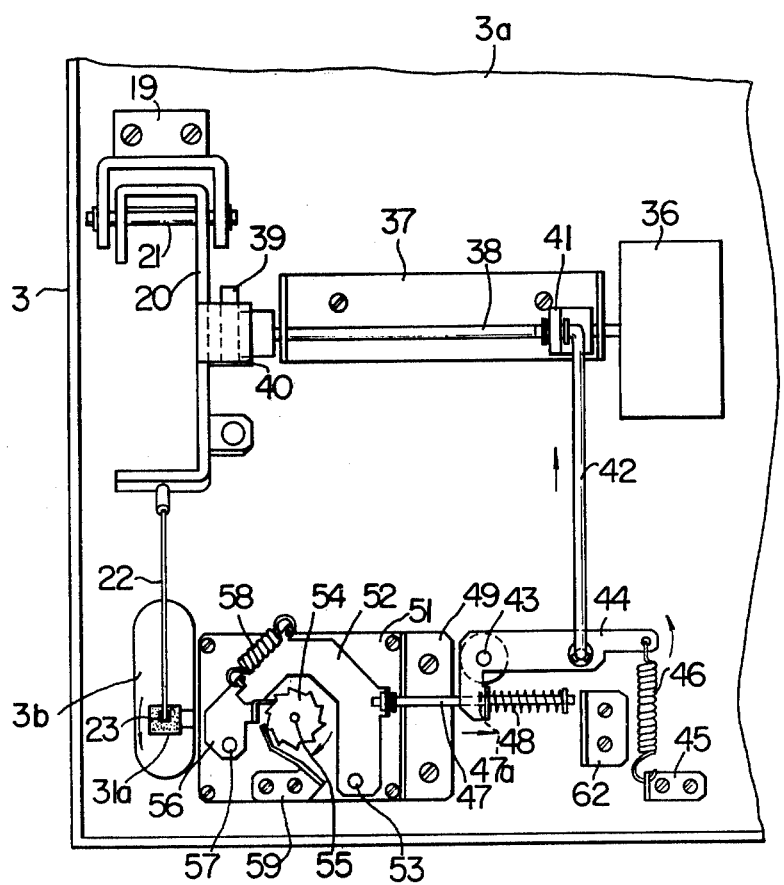
Figure 9:
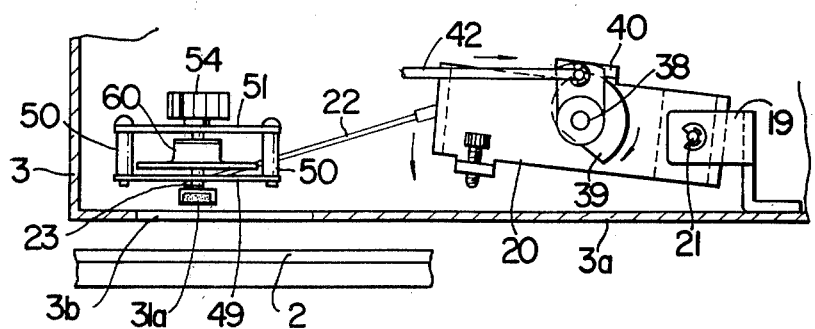
Figure 10:
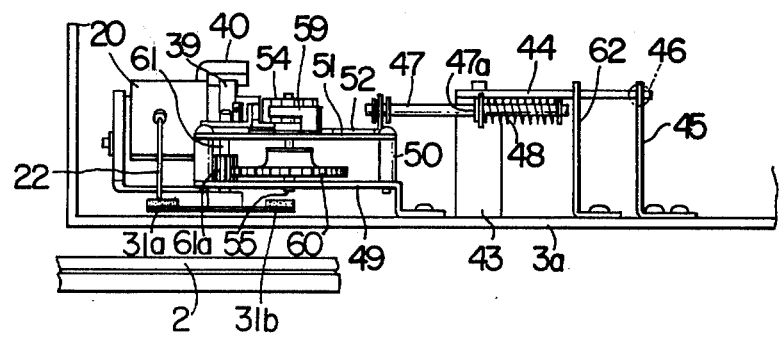
Figure 13:
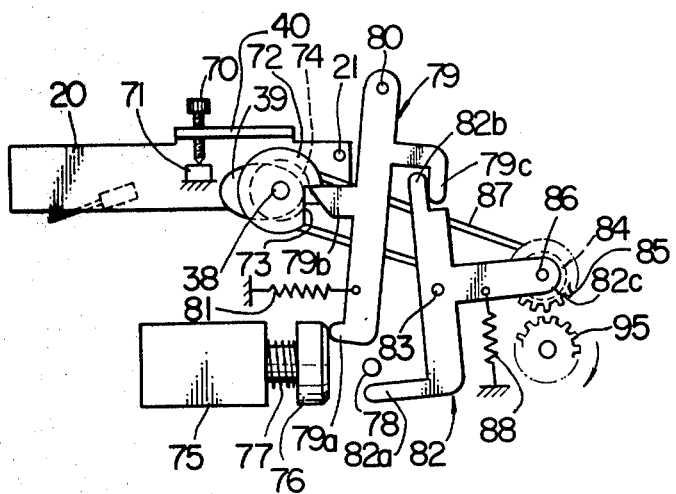
Figure 14:
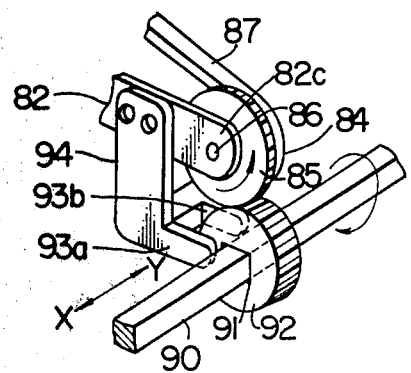

The above and other objects, as well as advantageous features of the invention will be more fully understood from the following description of the preferred embodiments taken in conjunction with the attached drawings in which:

FIG. 1 is a schematic plan view of an embodiment of the present invention,

FIG. 2 is a partially cutaway perspective view of an essential part of the embodiment as shown in FIG. 1, FIG. 3 is a perspective view of the essential part as shown in FIG. 2, FIGS. 4 and 5 are plan views of the part as shown in FIG. 2 in different states of operation, FIGS. 6A, 6B, 7A and 7B are side elevational views showing the positional relationship between a pickup needle and a cleaning member of the essential part, FIG. 8 is a plan view of an essential part of another embodiment of the invention, FIG. 9 is a side elevational view of the essential part as shown in FIG. 8, FIG. 10 is a front elevational view of the part as shown in FIG. 9, FIGS. 11, 12 and 13 are side elevational views of an essential part of still another embodiment of the invention in different states of operation, and FIG. 14 is a perspective view of an essential part of a further embodiment of the invention.

Referring first to FIG. 1 showing an example of a video disk player incorporating a cleaning device in accordance with the invention, a disk-shaped recording medium 2 is rotatably mounted on a turn table (not shown) which is rotatably carried by a carrier plate 1. A carriage generally designated at 3 houses, as will be detailed later, a pickup needle which is adapted to engage with the disk 2. The carriage 3 is held by a guide shaft 6 and a feed screw 5 which are rotatably supported by brackets 7a and 7b. The arrangement is such that the feed screw 5 is driven at a predetermined speed in a preselected direction, by a feed motor 4, so as to cause a linear movement of the carriage 3 along the guide shaft 6.

Referring now to FIG. 2 showing the internal mechanism of the carriage 3 of the video disk player which is a practical form of the invention, a nut 8 engaging the feed screw 5 is fixed to a base plate 3a of the carriage 3, while a slide bearing slidably engaging the guide shaft 6 is also fixed to the base plate 3a.

A solenoid 10 is shown to have a bracket 11 and a reset spring 16 for resetting a plunger thereof. A main arm 12 is carried by a rotary shaft 13 for free rotation therewith. The main arm is normally biased counter-clockwise by a tensile spring 17. A stopper 18 is provided for limiting the rotary movement of the main arm 12. A pawl 14 is pivotally mounted on the main arm 12, through a pivot pin 14a, and is biased counterclockwise by a spring 15 so as to engage with a ratchet wheel 28. A leaf spring 32 carried by a bracket 33 has one end engaging the ratchet wheel for preventing the reversing of the latter. A gear 29 disposed beneath the ratchet wheel 28 is adapted for rotating unitarily with the latter, and is engaged with a gear 30. Cleaning members 31a and 31b, disposed under the gear 30, are adapted to be rotated with the rotation of the gear 30. A holder 20 carried by a shaft 21 has a cantilever 22 which, in turn, carries a pickup needle 23. The shaft 21 is rotatably supported by bearings 19. A damper 26 consists of silicon grease filling the space between an outer housing and an inner rotatable disk.

An arm 25 adapted to rotate with the inner disk of the damper 26 is connected to the main arm 12 through a connecting arm 24. The damper 26 is fastened to the carriage through a bracket 27.

FIG. 3 is an enlarged perspective view of a part of the internal mechanism of the carriage as shown in FIG. 2. A pin 34 fixed to the lower side of the holder 20 contacts at its lower end a part of the main arm 12. The arrangement is such that the pin 34 comes into engagement with an inclined portion 12a of the main arm 12, when the main arm 12 is rotated in the direction of an arrow, so that the holder 20 is rotated up and down in accordance with the movement of the main arm 12, thereby to cause a vertical movement of the pickup means to and from the disk 3.

Turning again to FIG. 2, the parts illustrated therein are shown in respective reset positions, i.e., in the states for taking the pickup needle 23 out of engagement with the disk 2. More specifically, the solenoid 10 is not energized to allow the reset spring 16 to press the main arm 12 against the stopper 18. Consequently, the lower end of the pin 34 (See FIG. 3) carried by the lower side of the holder 20 is kept in engagement with the flat portion of the main arm, so as to keep the pickup needle 23 within the carriage 3, away from the disk 2. The cleaning member 31a is stationed in the vicinity of the pickup needle 23, at a height where it makes contact with the pickup needle when it is rotated.

FIG. 4 shows the internal mechanism of the carriage 3 in a state in which the main arm 12 has been rotated to a half degree of the total stroke thereof, soon after an energization of the solenoid 10. Namely, as the solenoid 10 is energized, the main arm 12 is rotated by the spring 17. However, this rotation of the main arm 12 is performed only at a limited speed, because of the presence of the damper 26. The ratchet wheel 28 has been rotated by the pawl 14, only by a pitch of teeth thereof, in accordance with the rotation of the main arm 12, and, accordingly, the cleaning member 31a has been rotated by a half turn from the position as denoted by 31b in FIG. 2, wiping and removing contaminants such as dust from the pickup needle 23.

Meanwhile, the lower end of the pin 34 secured to the lower side of the holder 20 is just about to leave the flat portion of the main arm 12 and about to become engaged with the inclined portion 12a (See FIG. 3) of the main arm 12. Thus, the holder 20, the cantilever 22 resiliently held by the holder 20 and the pickup needle secured to the end of the cantilever 22 are shown to have just commenced their downward movement toward the disk 2.

It will be seen that the pickup needle 23 is not allowed to be lowered during the cleaning operation, but commences its downward movement as soon as the cleaning operation is over.

Referring now to FIG. 5 which shows the mechanism as shown in FIG. 4 in a state several seconds after the state of FIG. 4, the main arm 12 has been rotated to make contact with the end of the plunger of the solenoid 10 and held at that position. Meanwhile, the holder 20 has been rotated downward and has completed its downward stroke. Consequently, the pickup needle 23 is allowed to project through a bore 3b formed in the base plate 3a of the carriage 3, into engagement with the groove of the disk 2, so as to pickup the signal recorded in the latter.

In order to stop the reproduction in a simple manner, the power supply to the solenoid 10 is interrupted. Then, since the resetting force of the spring, which acts to reset the main arm 12 clockwise, is selected greater than the counter-clockwise biasing force of the spring 17, the main arm 12 is returned to come into contact with the stopper 18. Consequently, the holder 20 is rotated upward, so as to move the pickup needle upward away from the disk 2. During this movement, the pawl 14 contacts the ratchet wheel 28 but rides over the ridge of the latter, because the ratchet wheel 28 is prevented by the leaf spring 32 from being reversed, so that every part of the mechanism is brought back to the state as shown in FIG. 2.

Needless to say, the cleaning members 31a, 31b are not rotated during the resetting, because the ratchet wheel is kept stationary.

This arrangement also provides the advantage that the described resetting operation is performed also in case of an accidental power failure during reproduction, thereby protecting the pickup needle from being damaged.

It is to be noted here, however, that there must be a specific relationship among the numbers of the teeth of the ratchet wheel 28, gears 29, 30 and the number of the cleaning members.

More specifically, representing the numbers of teeth of the ratchet wheel 28, the gear 29 and the gear 30 by Z1, Z2 and Z3, respectively, while the number of the cleaning members being represented by n, the following equation has to be satisfied for putting the cleaning member into effect in each cleaning operation.

$$Z1/n = Z2/Z3$$

Although the described embodiment is so constructed as to perform the cleaning operation at the moment immediately before the downward stroking of the pickup needle, it will be obvious to those skilled in the art that the cleaning device can be modified, while the working direction of the ratchet is reversed, so as to provide a cleaning operation immediately after the completion of the upward stroking of the pickup needle 23. Also, by mounting the cleaning devices 31a, 31b at an inclination with respect to the tangent to the circle along which they are rotated, the pickup needle 23 can be rotated even during the upward movement thereof. This arrangement is quite reasonable and preferred, because it becomes unnecessary to prepare a specific period for the cleaning operation. Alternatively, the angle of inclination of the cleaning members 31a, 31b may be made symmetrical with those of FIGS. 6A, 6B, as shown in FIGS. 7A and 7B, with respect to the line tangent to the circle along which these members are rotated, so that they may perform the cleaning operation during the downward movement of the pickup needle 23.

For enhancing the cleaning effect, the mechanism may incorporate a device for applying to the cleaning member a cleaning liquid such as an alcohol, before it turns to clean the pickup needle 23. At the same time, it is possible to modify the described construction, so as to bring a plurality of cleaning members into effect at each time of the cleaning operation.

FIGS. 8 to 10 show another embodiment of the invention, in which those which perform the same or corresponding function to those of the foregoing embodiment are denoted by the same reference numerals as those of the foregoing embodiment.

A motor 36 has an output shaft which is connected to a shaft 38 rotatably carried by a bracket 37. To the end of the shaft 38, is secured a cam 39. The cam 39 has a cam contour including an arcuate section centered at the axis of the shaft 38, over a certain circumferential length thereof, and a subsequent section the radius of which from the axis is gradually decreased.

The cam 39 is normally in contact with projection 40 fixed to the holder 20.

Namely, the arrangement is such that the holder 20 contacted and supported by the cam 39 is lowered in the direction of the arrow, as the shaft 38 is rotated in the direction of the arrow of FIG. 9 by the motor 36, so that the pickup needle held by the holder 20 is brought into contact with the disk 2.

The shaft 38 carries also a link 41 to which is connected a link rod 42 at its end. The other end of the link rod 42 is engaged with an arm 44 which is rotatably supported by a support shaft 43.

A spring 46 which is stretched between one end of the arm 44 and a spring retainer 45 biases the arm 44 in the clockwise direction.

A second link rod 47 is slidably supported by the other end of the arm 44. A spring 48 is stretched between one end of the link rod 47 and the other end of the arm 44. A stopper 47a fixed to the link rod 47 contacts the arm 44, so as to limit the sliding movement of the link rod 47 in the rightward direction as shown in FIG. 10.

To the base plate 3a of the carriage 3 and in parallel with the same, is secured by a lower adapter plate 49 which, in turn, carries an upper adapter plate 51 through the medium of supporting pillars 50.

An arm 52 mounted rotatably, through a shaft 53, on the upper adapter plate 51 engages the second link rod 47. A ratchet wheel 54 is fixed to a rotary shaft 55, while a pawl 56 is pivotally carried by the arm 52 through a pivot shaft 57. The pawl 56 is biased by a spring 58 so as to engage with the ratchet wheel 54.

The ratchet wheel 54 is prevented by a leaf spring 59, from being rotated counter-clockwise.

A gear 60 is fixed to the rotary shaft 55 to which also the ratchet wheel 54 is fixed. Another gear 61a meshing the gear 60 is fixedly carried by a rotary shaft 61. The cleaning members 31a, 31b are secured to the rotary shaft 61.

In operation, for causing a downward movement of the pickup needle 23 toward the recording disk 2, the motor 36 is started to cause a rotation of the shaft 38 in the direction of the arrow in FIG. 9.

The holder 20 is lowered, as stated before, in accordance with the rotation of the shaft 38.

Meanwhile, as a result of the rotation of the shaft 38, the first link rod 42 is pulled in the direction of the arrow in FIG. 8, and the arm 44 is rotated counter-clockwise against the biasing force of the spring 46.

Then, in accordance with the counter-clockwise rotation of the arm 44, the second link rod 47 is moved, through the spring 48, in the direction of the arrow, until it comes in contact with the stopper 62 (See FIG. 10).

The movement of the second link rod 47 in turn causes a clockwise rotation of the arm 52, so that the ratchet wheel 54 is rotated by a pitch of its teeth by the movement of the second link rod 47.

Consequently, the cleaning members 31a, 31b are rotated by a half turn, through the gears 60, 61a, thereby to clean the pickup needle 23.

The contour of the cam 39 is so selected that the holder 20 is held by the arcuate section of the cam when the cleaning member 31a, 31b are rotated, thereby the cleaning may be performed without lowering the holder 20.

The first link rod 42 is further moved in the direction of the arrow, during the downwrd movement of the pickup needle 23 which takes place subsequent to the cleaning operation. This further movement of the link rod 42 is afforded by the fact that the spring 48 is compressed by the arm 44 to absorb further movement.

It will be seen that the following advantages are derived from the present invention.

(a) Since the pickup needle is cleaned in accordance with the raising and/or lowering of the same, it is ensured that the pickup needle is always free from dust or other contaminants before it is put into the reproducing operation.

(b) The pickup needle can be cleaned at any time during reproduction, i.e., at what ever position on the disc it may be, the pickup needle may be cleaned without taking the labour of returning the pickup needle to the starting position.

(c) Since the surface of the pickup needle is always kept clean, not only the pickup needle itself but the disk as well can have a longer service time.

In the first and the second embodiments as described, the driving source for the holder 20 rely upon a solenoid 10 and a motor, respectively.

However, it is possible to make use of the torque of a screw rod as the driving source for the holder 20 through a suitable clutch mechanism.

FIGS. 11 thru 13 in combination show an example of such a modification as utilizing the torque of the feed screw 5 as the driving force for the holder 20.

In these Figures, the same parts are denoted by the same reference numerals as those of FIGS. 8 to 10.

Referring to FIG. 11 showing the mechanism in the state in which the pickup needle is out of reproducing operation, a lifting cam 39 is adapted to be rotated around the axis of the shaft 38. A projection 40 of the holder 20 bears against the periphery of the cam 39 at its lower surface so that the holder 20 may be lifted by the cam 39. The arrangement is such that the holder 20 is rotated to bring the pickup needle 23 away from the video disk 2, when the projection 40 is contacted at its lower surface by a longer-radius section of the cam 39, as shown in FIG. 11. This position of the holder 20 will be referred to as "non-operating position", hereinafter. As the lifting cam is further rotated from the position of FIG. 11 counter-clockwise, the holder 20 is gradually rotated counter-clockwise around the shaft 21, according to the rotation of the lifting cam 39, with its projection 40 kept in contact with the periphery of the lifting cam 39, through a state as shown in FIG. 12.

As the holder 20 is further rotated counterclockwise, a contact-pressure adjusting screw 70 for the needle, screwed into the projection 40, comes at its lower end, into contact with a stopper 71 fixed to the base plate 3a. Then, as shown in FIG. 13, the periphery of the lifting cam 39 clears the lower end of the projection 40 so that the pickup needle 23 comes into contact with the disk 2 at an adjusted pressure suitable for the reproduction. The position of the holder 20 in this state will be referred to as the "operating position", hereinafter.

Numeral 72 designtes a rocking cam which is adapted to be rotated unitarily with the lifting cam 39, around the axis of the shaft 38. The rocking cam 72 has a disk-like form partially notched at a portion thereof as at 73. A first pulley 74 is adapted for a rotation unitary with the lifting cam 39 and the rocking cam 72, around the axis of the shaft 38. The lifting cam 39, the rocking cam 72 and the first pulley 74 may be formed integrally together from the same material.

A solenoid 75, which is adapted to be energized upon depression of a reproduction push button, constitutes a part of a controlling mechanism. The solenoid 75 has a plunger 76, which is normally projected by the biasing force of the coiled compressing spring 77 so as to contact at its free end a stopper 78, when the solenoid 75 is not energized. However, when the solenoid 75 is energized, the plunger 76 is moved against the biasing force of the compressing spring 77, leftwardly as viewed on FIG. 11.

A rocking arm 79 is carried by the carriage 3 (not shown in FIGS. 11 to 13), for free rotation in a vertical plane, through a shaft 80. The lower end 79a of the rock arm 79 is adapted to make contact with the end surface of the plunger 76. At the left-hand side portion of the rocking arm 70, is formed a cam follower 79b adapted for engaging the periphery of the rock cam 72, while, at the right-hand side portion of the same, there is formed a unitary finger portion 79c. A tension spring 81 biases the rocking arm 79c in a clockwise direction. A driven arm 82 is mounted in the vicinity of the rocking arm 79, for rotation in a vertical plane, through a shaft 83, and has one end 82a adapted to make contact with the end of the plunger 76. The end 82b of the driven arm 82 is positioned so as to be engaged by the finger portion 79c of the rocking arm 79, while the other 82c rotatably carries, through a shaft 86, a driven gear 85, which constitutes a driven rotary member having a second pulley 84.

A rubber belt 87 is stretched between the first and the second pulleys 74, 84, so as to transmit the rotation of the idle gear 85 to the lifting cam 39 and, accordingly, to the rocking cam 72.

Reference numeral 95 is a screw rod extending in the direction of movement of the carriage 3 which spline rod 95 is normally rotated at a speed from 3 to 30 r.p.m. by means of a motor (not shown) for driving the turntable 1 or of the motor 4 for driving the feed screw 5. The driven arm 82 is biased by a tension spring 88, in the direction to put the driven gear 85 into engagement with the spline rod 95.

The lifting cam 39, the rocking cam 72 and the first pulley 74 are allowed to make only a limited rotation between a first position in which the periphery of the longer-radius section of the lifting cam contacts the lower surface of the projection 40 of the holder 20, while the notched portion 73 of the rocking cam 72 is directed downward, i.e., the position as shown in FIG. 11, and a second position as shown in FIG. 13 in which they are have been rotated counter-clockwise to 90° from the position of FIG. 11 so as to bring the notched portion 73 of the rocking cam 72 to abut against the cam follower portion 79b of the rocking arm 79. At the same time, they are normally biased clockwisely, i.e., to the first position, by means of a suitable means such as a torsion spring or the like, when the holder is kept in the non-reproducing or resting position.

In operation, at first a power source switch (not shown) is turned on to rotate the turn table and the video disk, so as to prepare for the reproduction. In this state, the spline rod 95 is rotated in the direction of the arrow, in accordance with the rotation of the turn table. Since the reproduction button is not depressed yet, all parts are stationed at the respective positions as shown in FIG. 11.

Then, the carriage 3 (See FIG. 1) is moved to bring the pickup needle at a position just above the groove of the disk 2 to be reproduced. As the reproduction button is depressed in this state, the solenoid 75 is energized to retract the plunger 76 leftward as viewed on FIG. 11, against the biasing force of the compression spring 77.

Consequently, the rocking arm 79 is biased in a clockwise direction by the tension spring 81. However, this rotation of the rocking arm 79 cannot be completed, because the end of the cam follower 79b contacts the periphery of the rock cam 72. The solenoid 75 is kept energized, until a stop button (not shown) is depressed.

Meanwhile, as a result of the retraction of the plunger 76, the driven arm 82 is rotated clockwise, by the force of the tension spring 88, around the axis of the shaft 83 so that the driven gear 85 is brought into engagement with the spline rod 95 under rotation.

Consequently, the driven gear 85 is rotated counter-clockwise, and through a second pulley 84, rubber belt 87 and the first pulley 84, the lifting cam 39 and the rocking cam 72 are rotated counter-clockwise around the axis of the shft 38 from the first to the second positions.

In this case the holder 20 is gradually rotated counter-clockwise in accordance with the rotation of the lifting cam 39 around the fulcrum provided by the shaft 21, due to its weight, so that the pickup needle is gradually lowered and approaches the disc 2.

The rotation of the holder 20 is stopped when the contact-pressure adjusting screw 70 comes into contact with the stopper 71, so as to place the pickup needle 23 into engagement with the selected groove on the disc 2, at an adjusted pressure, thereby performing the reproduction.

The rotation of the pulley 74 brings about also a counter-clockwise rotation of the rocking cam 72 toward the second position. As the rocking cam 72 is rotated to the second position, the cam follower portion 79b of the rocking arm 79 comes to fall onto the notched portion of the rock arm 79. Then, since the driven arm 82 is pressed leftward at its one end 82b through the finger portion 79c clockwise biased, the driven arm 82 is rotated around the axis of the shaft 83 against the biasing force of the tension spring 88 in the counter-clockwise direction, thereby disengaging the driven gear 85 from the screw rod 95. Consequently, the counter-clockwise rotation of the lifting cam 39 and the rocking cam 72 is stopped.

Although the lifting cam 39 and the rocking cam 72, including more exactly the transmission system having the first pulley 84, rubber belt 87 and the second pulley 84, have been biased clockwise toward the first position as shown in FIG. 11 by the aforementioned suitable means such as a torsion spring or the like, this clockwise rotation cannot take place, because the cam follower portion 79b of the rocking arm 79 rests in the notched portion 73 of the rocking cam 72 so the cams 39, 72 and the associated members assume the second position, i.e., at the reproducing position as shown in FIG. 13.

For stopping the reproduction, the stop button (not shown) is simply depressed so as to interrupt the power supply to the solenoid 75, thereby to allow the plunger 76 to project until it comes to bear against the stopper 78. Consequently, the end of the plunger 76 comes to press the lower end 79a of the rocking arm 79 rightward, so that the latter is rotated counter-clockwise around the axis of the shaft 80, overcoming the biasing force of the tension spring 81. This serves to disengage the end of the cam follower portion 79b from the notched portion 73 of the rocking cam 72 so as to allow the aforementioned suitable means such as a torsion spring or the like to rotate the lifting cams 39 and the rocking cam 72 (inclusive the power transmission system having the first pulley 74, rubber belt 87 and the second pulley 84) in the clockwise direction to the first position as shown in FIG. 11. Consequently, the holder 20 is raised so as to disengage the pickup needle from the disk 2.

Meanwhile, the plunger 76 pushes, during its rightward returning movement, one end 82a of the driven arm 82 rightward so that the driven arm 82 is rotated counter-clockwise against the biasing force of the tension spring 88 about the axis of the shaft 83 so as to disengage the driven gear 85 from the spline rod 95. That is, the respective parts are returned to the state as shown in FIG. 11.

Although not illustrated, the rotation of the lifting cam 39 is transmitted to an arm similar to that of FIG. 8 through suitable means such as a link rod 42 of FIG. 8, in the arrangement as shown in FIGS. 11 and 12, and the cleaning of the pickup needle is effected in the same manner as that performed by the arrangement as shown in FIG. 8.

In this embodiment, in order that the pickup needle 23 may be put into engagement with any desired portion of the data zone (the zone of the disk in which the recording groove is formed) of the disk, it is necessary to make the whole region of the screw rod 95 over which the carriage slides, engageable with the driven gear 85.

To this end, the screw rod 95 must have a toothed portion of relatively long length corresponding to the region over which the carriage moves. However, the use of such a long gear inconveniently raises the cost of the device and, therefore, it is impractical.

As an alternative practical measure, a construction as shown in FIG. 14 may effectively be used.

Namely, a rotary shaft 90 having a square cross-section is adapted to be rotated in accordance with the rotation of the turn table, and is extended in parallel with the passage of the carriage 3. A drive gear 27 of a suitable thickness has a square bore 91 of a size slightly larger than that of the square cross-section of the rotary shaft 90. The square bore 91 slidably receives the rotary shaft 90. Naturally, it will be appreciated that the rotary shaft 90 rotates the gear 92. A member 94 mounted in the vicinity of the end 82c of the arm 82 has a pair of finger members 93a, 93b spaced from each other by a distance slightly larger than the thickness of the drive gear 92. The drive gear 92 is positioned between the finger members 93a and 93b. Needless to say, the driven gear 85 is positioned so as to be possible to make optional engagement with the drive gear 92.

According to this arrangement, as the carriage 3 is moved, i.e., as the driven arm 82 moves in the directions of arrows X and Y, the drive gear 92 is moved in the same direction while it rotates. It will be seen that, with this arrangement, the use of a gear having a long toothed portion can be eliminated.

The square shape cross-section of the drive shaft 90 and that of the mating bore 91 are not the only shapes which can be used. For instance, the cross-section of the drive shaft 92 and the profile of the bore 91 may be triangular, pentagonal, hexagonal or other polygonal shape. Alternatively, they may be rounded, each having a groove (or projection) while a mating projection (or groove) is formed in the other. Thus, all what is required is to permit the drive gear 92 to slide on the drive shaft 90, preventing the rotary movement relative to each other.

Further, rubber rollers can be used in place of the drive and the drive gears 85, 92.

In the foregoing embodiments, transmission means including the first pulley 74, second pulley 84 and the rubber belt 87 is used for transmitting the torque of the driven gear 85 to the lifting and the rock cams 39, 72. However, it is of course possible to use any known transmission means such as timing belt, rudder chain or gear train may be used, in place of the transmission means of the described embodiments.

In the embodiment illustrated in FIGS. 11 to 14, the spline rod 95 may be rotated at a low speed so that the holder 20 may be lowered at a suitable speed, thereby eliminating such a damper mechanism as the damper 26 shown in FIG. 2.

What is claimed is:

1. A pickup needle cleaning device for a recording disk playback apparatus comprising:
    a pickup needle adapted to detect recorded signals from a recording disc,
    means for holding said pickup needle,
    a carrige supporting said holding means and adapted to move above and along the recording disk,
    means for driving said carriage above and along said recording disk,
    means, mounted on said carriage, for moving said holding means to lift and lower said pickup needle so as to move said pickup needle towards and away from the recording surface of said recording disk,
    means, mounted on said carriage, for actuating said lifting and lowering means,
    means, mounted on said carriage, when driven, for cleaning said pickup needle, and
    means for driving said cleaning means in association with the lifting and lowering operation of said pickup needle.

2. A pickup needle cleaning device as claimed in claim 1, wherein said cleaning means includes at least one cleaning member adapted to rotate in the vicinity of said pickup needle in the lifted position and to move into and out of contact with said pickup needle in association with the rotation of said cleaning member.

3. A pickup needle cleaning device as claimed in claim 2, wherein said cleaning member is held at an angle of inclination with respect to the plane in which it is rotated.

4. A pickup needle cleaning device as claimed in claim 2, wherein said means for lifting and lowering the pickup needle includes an arm adapted to be rotated in a horizontal plane by said actuating means, said arm having a horizontal flat section succeeded by an inclined section, said means for holding the pickup needle having a portion thereof resting on said arm, whereby said means for holding the pickup needle slides from said horizontal flat section to said inclined section of said arm in accordance with the rotation of the latter so as to be lowered and to cause the rotation of said cleaning member.

5. A pickup needle cleaning device as claimed in claim 2, wherein said means for lifting and lowering the pickup needle includes a cam adapted to be rotated in a vertical plane by said actuating means and having a periphery contacted by said means for holding the pickup needle, whereby said means for holding the pickup needle is lowered and said cleaning member is rotated.

6. A pickup needle cleaning device as claimed in claim 1, wherein said means for driving drives said cleaning member during a time preceding the lowering of said pickup needle.

7. A pickup needle cleaning device as claimed in claim 1, wherein said actuating means includes a clutch means adapted for optional engagement with said means for driving said carriage.

8. A pickup needle cleaning device as claimed in claim 1, further comprising a first rotating member extending in the direction of movement of said carriage, a second rotating member engaged with said first rotating member and moved with said carriage in the direction of movement of said carriage, and a clutch means selectively engageable with said second rotating member for driving said actuating means.

* * * * *